(No Model.)
E. THORP.
FRICTION HINGE.
No. 425,714. Patented Apr. 15, 1890.
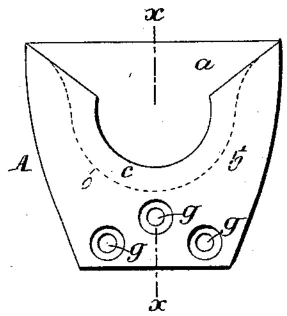
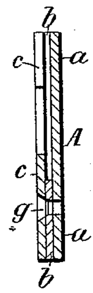
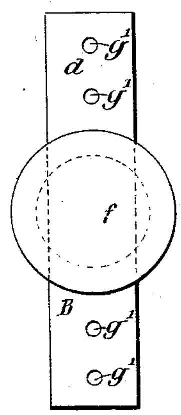
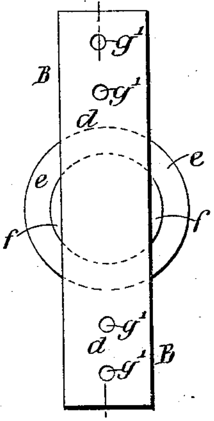
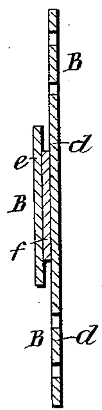
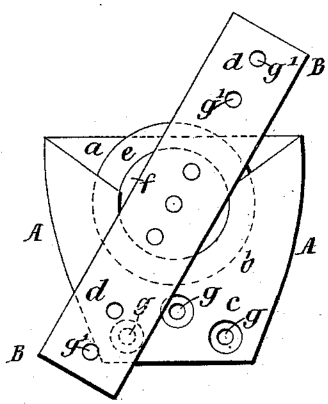
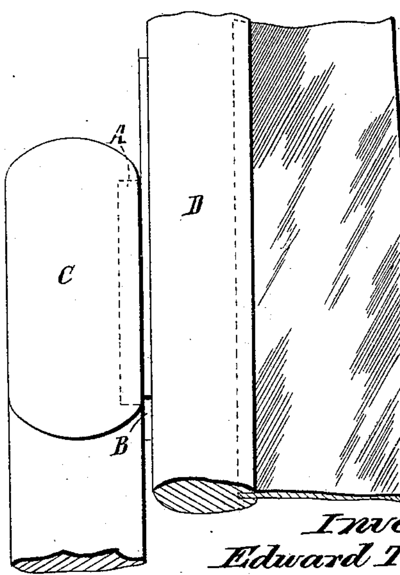
Witnesses.
J. G. Meyer Jr.
Robert Everett.
Inventor.
Edward Thorp.
By James L. Norris.
Atty.
THE NORRIS PETERS CO., PHOTO-LITHO., WASHINGTON, D. C.

UNITED STATES PATENT OFFICE.

EDWARD THORP, OF LONDON, ENGLAND, ASSIGNOR TO ARTHUR EVANS THORP, OF SAME PLACE.

FRICTION-HINGE.

SPECIFICATION forming part of Letters Patent No. 425,714, dated April 15, 1890.

Application filed January 23, 1890. Serial No. 337,833. (No model.)

*To all whom it may concern:*

Be it known that I, EDWARD THORP, joiner, a subject of the Queen of Great Britain, and a resident of London, England, have invented certain new and useful Improvements in Pivot Adjustments, of which the following is a specification, reference being had to the accompanying drawings.

My invention has for its object to provide an improved device for supporting mirrors or looking-glasses and other articles in such a manner that they may be freely turned about a horizontal axis into any desired position and will be retained in such position, and may be readily removed from and replaced in their frame or other support.

The improved device is composed of two main portions, one of which forms a socket or bearing and is fixed to the rigid frame-work, stand, or support, while the other forms a pivot, and is attached to the movable or swinging portion of the mirror or other article.

In the accompanying drawings, Figure 1 is a front elevation of the socket portion of my improved device. Fig. 2 is a vertical section on the line *x x*, Fig. 1. Figs. 3 and 4 show front and rear elevations, respectively, of the pivot portion of the said device. Fig. 5 is a vertical section on the line *y y*, Fig. 4. Fig. 6 shows the two parts of my improved device fitted together ready for use, and Fig. 7 shows the said device applied to a looking-glass.

Like letters indicate corresponding parts throughout the drawings.

A is the socket or bearing, and B is the movable or pivot portion of my improved device.

C, Fig. 7, is the frame or stand of a looking-glass, and D is the movable or swinging portion thereof.

The socket or bearing A may be conveniently formed of three pieces *a b c*, of wood, metal, or other suitable material, united by riveting or soldering or in any other convenient manner; or the said socket may be cast in one piece. The part or piece *a* forms the back of the socket, and is placed in contact with the surface to which the socket is attached. The piece *c* forms the front of the socket, the piece *b* being placed between the two pieces *a* and *c*. The parts *b* and *c* are each formed with a recess or bearing, as shown, the recess in the part *b* being larger than that in the part *c*, so that a groove or channel, as indicated by the dotted line *b′ b′*, Fig. 1, is formed between the parts *a* and *c*. The said recesses or bearings are semicircular, the sides extending upward vertically, or nearly so, and then diverging from each other at the upper end, so as to facilitate the insertion of the wheels hereinafter described.

The pivot portion B of my improved device, as shown in detail in Figs. 3, 4, and 5, is composed of a strip *d*, of wood, metal, or other suitable material, by which it may be fixed to the movable portion of the mirror or other article, and which has formed thereon or attached thereto two concentric disks or wheels *e f*, preferably of the same material as the said strip. The smaller disk or wheel *f* is placed between the strip *d* and the larger disk or wheel *e*. The said disks or wheels are of such dimensions that the disk or wheel *e* will enter the groove or channel between the parts *a* and *c* of the socket A, and the said part *c* will fit easily between the wheels *e* and *f*, and when the pivot portion B is placed in the socket portion A the larger wheel *e* will rest in the semicircular recess or cavity in the part *b* of the socket, and the smaller wheel *f* will rest in the recess or cavity in the part *c* of the said socket, as shown in Fig. 6. The pivot portion B is then free to turn about the axis of the wheels. By reason of the comparatively large surface of contact between the circumference of the wheels and the bearing-surfaces of the socket the friction is comparatively great, and although the part B can be readily turned by hand, yet, when adjusted to any particular position, it will remain in such position when the hand is removed. The amount of friction between the parts may be further increased by forming the disks or wheels and the part *c* of the socket of such thickness that the lateral surfaces thereof are brought into contact with the adjacent surfaces of the socket A and of the movable or pivot portion B, respectively.

The mode of applying the improved device is as follows, viz: The socket A is attached to the frame or support of the looking-glass or other article by screws passed through the holes *g* or by other suitable means, the part

*a* being in contact with the said frame or support. The movable or pivot portion B is attached to the movable portion of the looking-glass or other article by screws passed through the holes *g'* or by other suitable means. One of my improved devices may be used on each side of the looking-glass or other article, or my improved device may be used on one side and any ordinary pivot on the other side thereof.

In some cases I construct my improved device with more than two disks or wheels arranged side by side on the same axis and alternately of large and small diameter, the socket being similarly formed with a succession of plates arranged side by side with grooves or channels between them.

In other cases I construct my improved device with a small slot at the bottom of each cup or socket.

The plate *a* of the socket A may be of the same shape as the plate *b*, the central and upper portion thereof being dispensed with; or the said socket A may be secured to the frame or stand of the looking-glass or other article by screws passed through holes in the upper portion of the plate *a*, in which case the part of the socket provided with the holes *g* is dispensed with. The plate A, instead of being let into the standard C of the mirror, may be simply secured to the surface thereof.

My invention is applicable to various articles besides looking-glasses. For example, it is advantageous for pivoted or swing fan-lights, telescopes, photographic cameras, school-slates, and in all other cases where a pivot of a similar nature is desirable.

I wish it to be understood that I do not confine myself to any particular thickness of material nor to any shape or pattern of the said device.

In some cases it is desirable to have one part of the device made of thicker material than the other part.

What I claim is—

A pivot for looking-glasses and other articles, consisting of the plates *a*, *b*, and *c*, screwed together and to the support, said plates *b* and *c* recessed at their upper ends to different depths, whereby a circular groove is formed, in combination with the pivot consisting of the plates *d*, *e*, and *f*, said plates *e* and *f* being of circular form and one made larger than the other, whereby a projection is formed that is adapted to be set into the circular groove, substantially as set forth.

In testimony whereof I have hereunto signed my name in the presence of two subscribing witnesses.

EDWARD THORP.

Witnesses:

JOHN THOMAS FOX,
19 *Broadmead Road, Folkestone.*
JAMES WADDELL,
41 *Coolerige Road, Folkestone.*